(12) United States Patent
Wei et al.

(10) Patent No.: US 10,917,545 B2
(45) Date of Patent: Feb. 9, 2021

(54) CAMERA MODULE AND ELECTRONIC DEVICE

(71) Applicant: GUANGDONG OPPO MOBILE TELECOMMUNICATIONS CORP., LTD., Guangdong (CN)

(72) Inventors: Yi Wei, Guangdong (CN); Qiqun Zhou, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/118,330

(22) Filed: Aug. 30, 2018

(65) Prior Publication Data

US 2019/0075227 A1 Mar. 7, 2019

(30) Foreign Application Priority Data

Sep. 6, 2017 (CN) .......................... 2017 1 0797328

(51) Int. Cl.
*H04N 5/225* (2006.01)
*H04M 1/02* (2006.01)
(Continued)

(52) U.S. Cl.
CPC ........... *H04N 5/2254* (2013.01); *G02B 7/102* (2013.01); *G02B 15/14* (2013.01); *H04M 1/0264* (2013.01);
(Continued)

(58) Field of Classification Search
CPC .. H04N 5/2254; H04N 5/2257; H04N 5/2253; H04N 5/2252; H04M 1/0264; G02B 15/14; G02B 7/102
See application file for complete search history.

(56) References Cited

U.S. PATENT DOCUMENTS

2006/0109366 A1* 5/2006 Humpston ........ H01L 27/14625
348/340
2009/0316284 A1 12/2009 Kim et al.
(Continued)

FOREIGN PATENT DOCUMENTS

CN 101581818 A 11/2009
CN 102455478 A 5/2012
(Continued)

OTHER PUBLICATIONS

Chinese Patent Application No. 201710797328.4 Office Action dated Mar. 29, 2019, 8 pages.
(Continued)

*Primary Examiner* — Lin Ye
*Assistant Examiner* — Tuan H Le
(74) *Attorney, Agent, or Firm* — Lathrop GPM LLP (57) ABSTRACT

A camera module includes a fixed member, a movable member, a lens unit and a driving member. A top surface of the fixed member is provided with a through hole, and is a step surface and includes first and second sub-top-surfaces mutually connected, and the first sub-top-surface is inclined with respect to the second sub-top-surface and defines a notch together with the second sub-top-surface. The movable member is accommodated in the fixed member and corresponds to the through hole. The lens unit is accommodated in the movable member and corresponds to the through hole. The driving member is provided in the fixed member and located at a side of the fixed member away from the notch, and configured to drive the movable member to lead the lens unit to move along an optical axis of the lens unit. The present disclosure further discloses an electronic device.

18 Claims, 10 Drawing Sheets

(51) Int. Cl.
*G02B 7/10* (2006.01)
*G02B 15/14* (2006.01)

(52) U.S. Cl.
CPC ......... *H04N 5/2252* (2013.01); *H04N 5/2253* (2013.01); *H04N 5/2257* (2013.01)

(56) References Cited

U.S. PATENT DOCUMENTS

| | | | |
|---|---|---|---|
| 2010/0182490 A1* | 7/2010 | Seol | G02B 7/08 348/345 |
| 2011/0050989 A1 | 3/2011 | Kim et al. | |
| 2012/0020654 A1 | 1/2012 | Yanagisawa et al. | |
| 2014/0253592 A1* | 9/2014 | Cho | G06T 19/006 345/633 |
| 2014/0320738 A1 | 10/2014 | Kim | |
| 2015/0364980 A1* | 12/2015 | Liao | H02K 41/0356 310/12.16 |
| 2016/0173744 A1 | 6/2016 | Kim | |
| 2016/0344912 A1 | 11/2016 | Baik et al. | |
| 2017/0192199 A1 | 7/2017 | Park | |

FOREIGN PATENT DOCUMENTS

| | | |
|---|---|---|
| CN | 102883033 A | 1/2013 |
| CN | 105589169 A | 5/2016 |
| CN | 105911796 A | 8/2016 |
| CN | 106154477 A | 11/2016 |
| CN | 106161897 A | 11/2016 |
| CN | 205901886 U | 1/2017 |
| CN | 106686283 A | 5/2017 |
| CN | 107508938 A | 12/2017 |
| EP | 1670240 A1 | 6/2006 |
| KR | 20170048064 A | 5/2017 |
| WO | WO 2017080432 A1 | 5/2017 |

OTHER PUBLICATIONS

Chinese Patent Application No. 201710797328.4 English translation of Office Action dated Mar. 29, 2019, 9 pages.
European Patent Application No. 18192412.7, Office Action dated Oct. 1, 2019, 4 pages.
European Patent Application No. 18192412.7, Extended Search and Opinion dated Jan. 23, 2019, 7 pages.
PCT/CN2018/104078 English Translation of the International Search Report and Written Opinion dated Nov. 22, 2018, 11 pp.
Indian Patent Application No. 201834032913, First Office Action dated Jun. 24, 2020, 6 pages.
Chinese Patent Application No. 201710797328.4, Notice of Allowance dated Apr. 14, 2020, 4 pages.
Chinese Patent Application No. 201710797328.4, English translation of Notice of Allowance dated Apr. 14, 2020, 5 pages.

* cited by examiner

(12) United States Patent
US 10,917,545 B2

CAMERA MODULE AND ELECTRONIC DEVICE

CROSS-REFERENCE TO RELATED APPLICATION

This application claims priority to and benefits of Chinese Patent Application Serial No. 201710797328.4, filed with the State Intellectual Property Office of P. R. China on Sep. 6, 2017, the entire content of which is incorporated herein by reference.

FIELD

The present disclosure relates to a technical field of consumer electronics, and particularly to a camera module and an electronic device.

BACKGROUND

With the development of science and technology, smart phones are becoming more and more widely used and have more and more functions, which have become necessary electronic apparatus for people's daily life. The camera module in existing smart phones has a relatively large volume, so that a screen-to-body ratio of the screen assembly is relatively low, which in turn leads to a poor user experience.

SUMMARY

A camera module according to embodiments of the present disclosure includes: a fixed member having a top surface, the top surface being provided with a through hole, the top surface being a step surface and including a first sub-top-surface and a second sub-top-surface connected with each other, the first sub-top-surface being inclined with respect to the second sub-top-surface and defining a notch together with the second sub-top-surface; a movable member accommodated in the fixed member and corresponding to the through hole; a lens unit accommodated in the movable member and corresponding to the through hole; and a driving member provided in the fixed member and located at a side of the fixed member away from the notch, the driving member being configured to drive the movable member to lead the lens unit to move along an optical axis of the lens unit.

A camera module according to embodiments of the present disclosure includes: a fixed member having a top surface and an accommodating space, the top surface being provided with a through hole, the top surface being a step surface and comprising a first sub-top-surface and a second sub-top-surface connected with each other, the first sub-top-surface being inclined with respect to the second sub-top-surface and defining a notch together with the second sub-top-surface, the accommodating space is communicated with the through hole; a movable member accommodated in the accommodating space and corresponding to the through hole; a lens unit accommodated in the movable member and corresponding to the through hole; and a driving member provided in the accommodating space and located at a side of the fixed member away from the notch, the driving member being configured to drive the movable member to lead the lens unit to move along an optical axis of the lens unit.

An electronic device according to embodiments of the present disclosure includes: a casing provided with a mounting hole; a camera module including a fixed member having a top surface, the top surface being provided with a through hole, the top surface being a step surface and comprising a first sub-top-surface and a second sub-top-surface connected with each other, the first sub-top-surface being inclined with respect to the second sub-top-surface and defining a notch together with the second sub-top-surface, a movable member accommodated in the fixed member and corresponding to the through hole, a lens unit accommodated in the movable member and corresponding to the through hole, and a driving member provided in the fixed member and located at a side of the fixed member away from the notch, the driving member being configured to drive the movable member to lead the lens unit to move along an optical axis of the lens unit, the camera module being mounted in the mounting hole; and a display module, the display module being mounted in the casing, covering the notch and exposing the lens unit.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Hereinafter, embodiments of the present disclosure will be described in detail. Examples of the embodiments are illustrated in the accompanying drawings, the same or similar reference numerals throughout the descriptions denote the same or similar elements or elements having the same or similar functions. The embodiments described with reference to the accompanying drawings are exemplary, only for the explanation of the present disclosure, and cannot be understood as a limitation of the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present disclosure be constructed or operated in a particular orientation, thus cannot be construed as limitation of the present disclosure. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled" and the like are used broadly, and may be, for example, fixed connections, detachable connections, or integral connections; may also be mechanical or electrical connections or communicable with each other; may also be direct connections or indirect connections via intervening structures; may also be inner communications or interaction relationship of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

The following disclosure provides many different embodiments or examples for implementing different structures of the present disclosure. In order to simplify the disclosure of the present disclosure, the components and settings of specific examples are described below. Of course, these are only examples, and are not intended to limit the present disclosure, moreover, the present disclosure may repeat reference numerals and/or reference letters in different examples. This repetition is for the purpose of simplification and clarity and does not indicate relationships between the various embodiments and/or settings in discussion. In addition, the present disclosure provides examples of a variety of specific processes and materials, but those skilled in the art can be aware of the application of other processes and/or the use of other materials.

Figure 1:
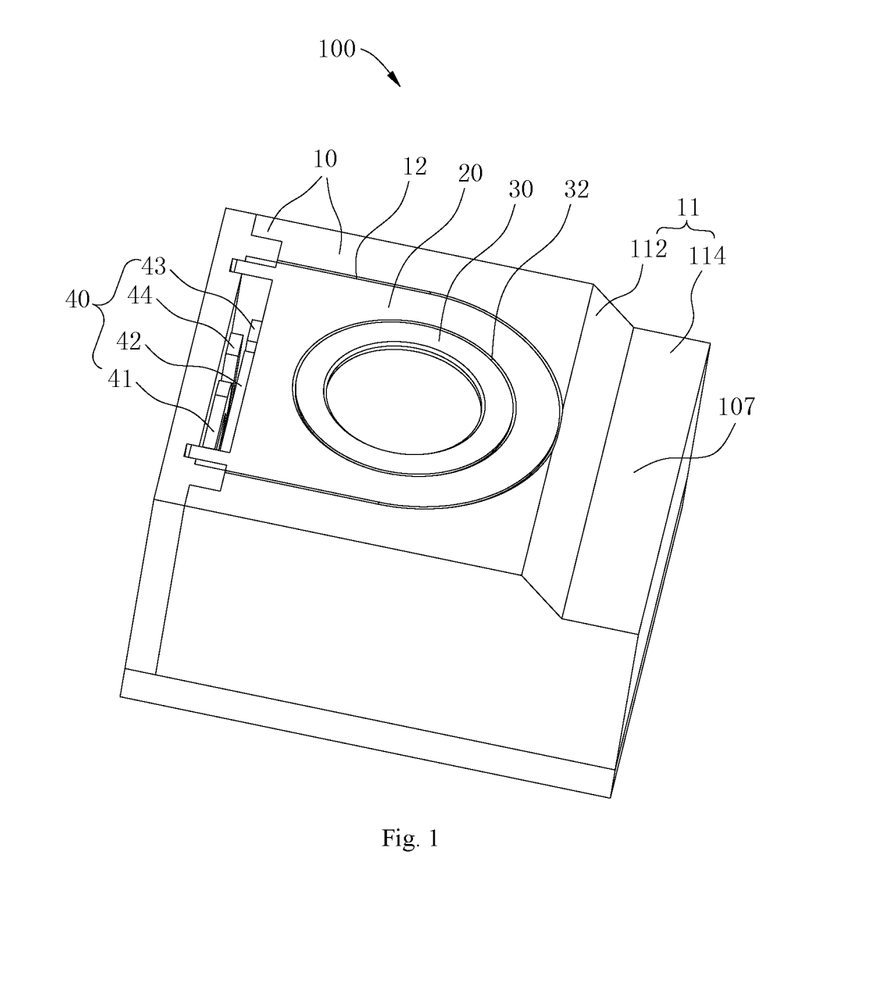
FIG. 1 is a perspective schematic view of a camera module of some embodiments of the present disclosure.
Figure 2:
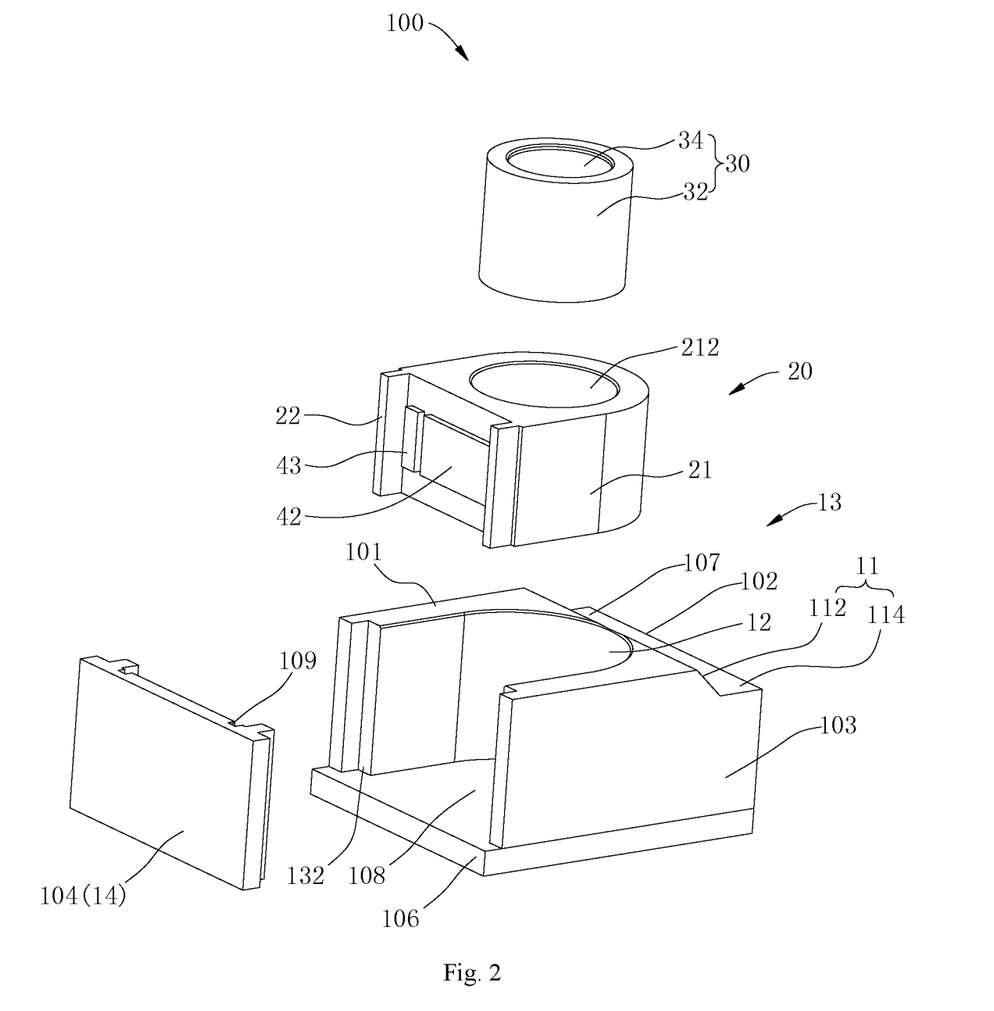
FIG. 2 is an exploded view of a camera module of some embodiments of the present disclosure.

As illustrated in FIG. 1 and FIG. 2, a camera module 100 of embodiments of the present disclosure includes a fixed member 10, a movable member 20, a lens unit 30 and a driving member 40. A top surface 11 of the fixed member 10 is provided with a through hole 12, the top surface 11 is a step surface and includes a first sub-top-surface 112 and a second sub-top-surface 114 connected with each other. The first sub-top-surface 112 is inclined relative to the second sub-top-surface 114 and defines a notch 107 together with the second sub-top-surface 114. The movable member 20 is accommodated in the fixed member 10 and corresponds to the through hole 12. The lens unit 30 is accommodated in the movable member 20 and corresponds to the through hole 12. The driving member 40 is provided in the fixed member 10 and located at a side of the fixed member 10 away from the notch 107, the driving member 40 is configured to drive the movable member 20 to lead the lens unit 30 to move along an optical axis of the lens unit 30.

The first sub-top-surface 112 can be a flat surface, the second sub-top-surface 114 can be a flat surface or a curved surface, the shapes of the first sub-top-surface 112 and the second sub-top-surface 114 can fall within the protective scope of the present disclosure as along as the notch 107 formed by the first sub-top-surface 112 and the second sub-top-surface 114 can reduce the volume of the fixed member 10. The notch 107 can be communicated with the through hole 12, or the notch 107 is not communicated with the through hole 12 and is located at a side of the through hole 12.

In the camera module 100 of the embodiments of the present disclosure, the side of the fixed member 10 away from the driving member 40 is provided with the notch 107, so that a volume of the camera module 100 can be reduced and a display screen is able to be arranged at the notch to be more adjacent to the camera module 100, thereby increasing the screen-to-body ratio of the screen assembly; meanwhile, the driving member 40 can drive the movable member 20 to lead the lens unit 30 to move along the optical axis, so that the camera module 100 has a zoom function.

As illustrated in FIG. 1, the camera module 100 of embodiments of the present disclosure includes the fixed member 10, the movable member 20, the lens unit 30 and the driving member 40.

Figure 3:
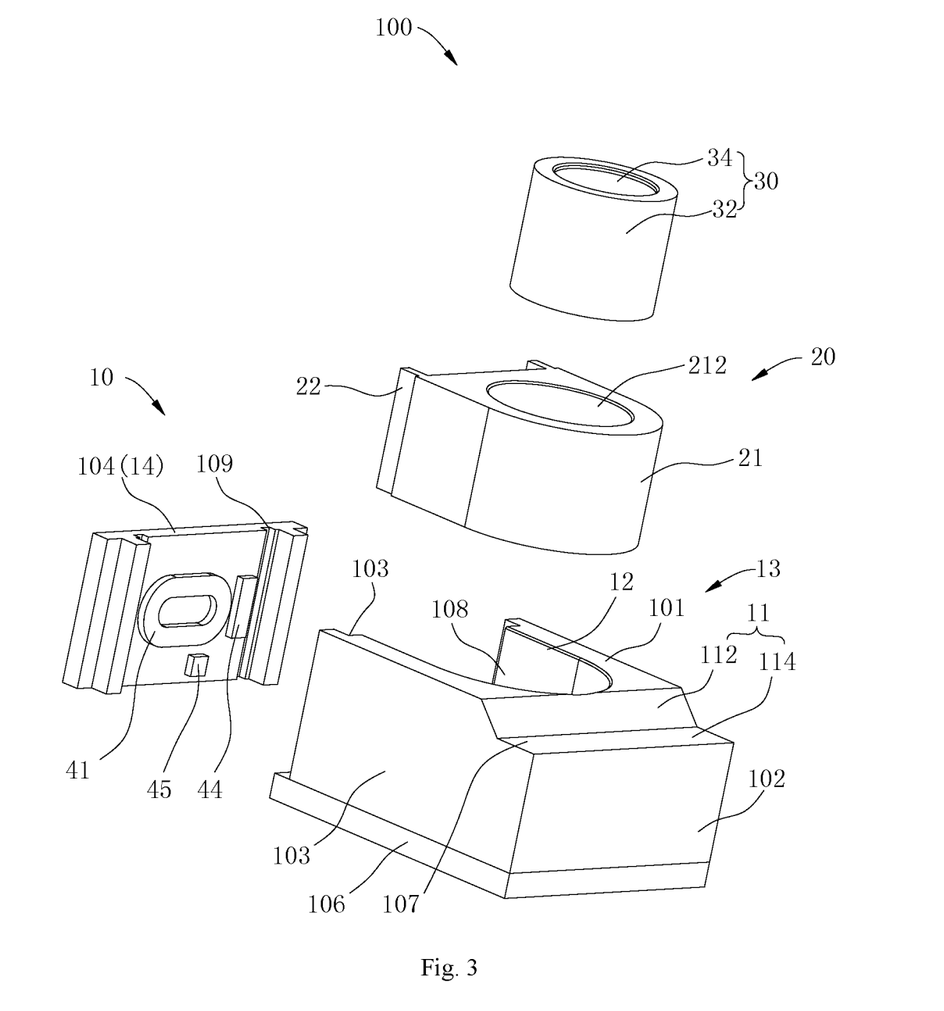
FIG. 3 is an exploded view of a camera module of some embodiments of the present disclosure.

As illustrated in FIG. 2 and FIG. 3, the fixed member 10 can exhibit a barrel shape having a rectangular section contour. The fixed member 10 includes a first side wall 101, a second side wall 102, a third side wall 103, a fourth side wall 104, and a bottom wall 106. The first side wall 101 is opposite to the third side wall 103, the second side wall 102 is opposite to the fourth side wall 104, and the bottom wall 106 is connected to each of the first side wall 101, the second side wall 102, the third side wall 103 and the fourth side wall 104. An accommodating space 108 is enclosed by the first side wall 101, the second side wall 102, the third side wall 103, the fourth side wall 104 and the bottom wall 106 together. The fixed member 10 includes a top surface 11 opposite to the bottom wall 106, the top surface 11 is provided with the through hole 12 communicated with the accommodating space 108. The top surface 11 is the step surface and includes the first sub-top-surface 112 and the second sub-top-surface 114 connected with each other. The first sub-top-surface 112 is inclined relative to the second sub-top-surface 114 and defines the notch 107 together with the second sub-top-surface 114. The notch 107 runs through the first side wall 101 and the third side wall 103 and is provided at an end of the second side wall 102 adjacent to the top surface 11. The accommodating space 108 may have a circular, triangular, rectangular or polygonal section. In other embodiments, the fixed member 10 can also exhibit a barrel structure having a circular, triangular, or polygonal section contour. In other embodiments, the bottom wall 106 can be detachably connected with the first side wall 101, the second side wall 102, the third side wall 103 and the fourth side wall 104.

The fixed member 10 is provided with a guide slot 109, the guide slot 109 of the fixed member 10 is arranged along a direction of the optical axis of the camera module 100, that is, a longitudinal direction of the guide slot 109 of the fixed member 10 is substantially parallel to the optical axis of the camera module 100. One or a plurality of guide slots 109 of the fixed member 10 may be provided. When one guide slot 109 of the fixed member 10 is provided, the one guide slot 109 of the fixed member 10 may be arranged in any one of the first side wall 101, the third side wall 103 and the fourth side wall 104; when the plurality of guide slots 109 of the fixed member 10 is provided, the plurality of guide slots 109 of the fixed member 10 may be arranged in any one or more of the first side wall 101, the third side wall 103 and the fourth side wall 104. When the guide slot 109 of the fixed member 10 is arranged in the first side wall 101 or the third side wall 103, the guide slot 109 of the fixed member 10 and the notch 107 are staggered. In this embodiment, the guide slot 109 of the fixed member 10 is arranged in the fourth side wall 104.

As illustrated in FIG. 1 to FIG. 3, the movable member 20 includes a body 21 and a guide rail 22 provided to the body 21. The number of the guide rail 22 of the movable member 20 is the same as the number of the guide slot 109 of the fixed member 10. A position of the guide rail 22 of the movable member 20 corresponds to a position of the guide slot 109 of the fixed member 10. The guide rail 22 of the movable member 20 is fitted in the guide slot 109 of the fixed member 10 and is able to slide along the guide slot 109 of the fixed member 10. The movable member 20 can be movably accommodated in the accommodating space 108. A shape of the movable member 20 matches a shape of the accommodating space 108. The body 21 of the movable member 20 is provided with an accommodating hole 212.

As illustrated in FIG. 2 and FIG. 3, the lens unit 30 includes a lens barrel 32 and an optical lens 34 provided in the lens barrel 32. The lens barrel 32 is accommodated and fixed in the accommodating hole 212. The lens unit 30 can move along with a movement of the movable member 20. In other embodiments, the lens barrel 32 may be integrally formed with the movable member 20.

Figure 4:
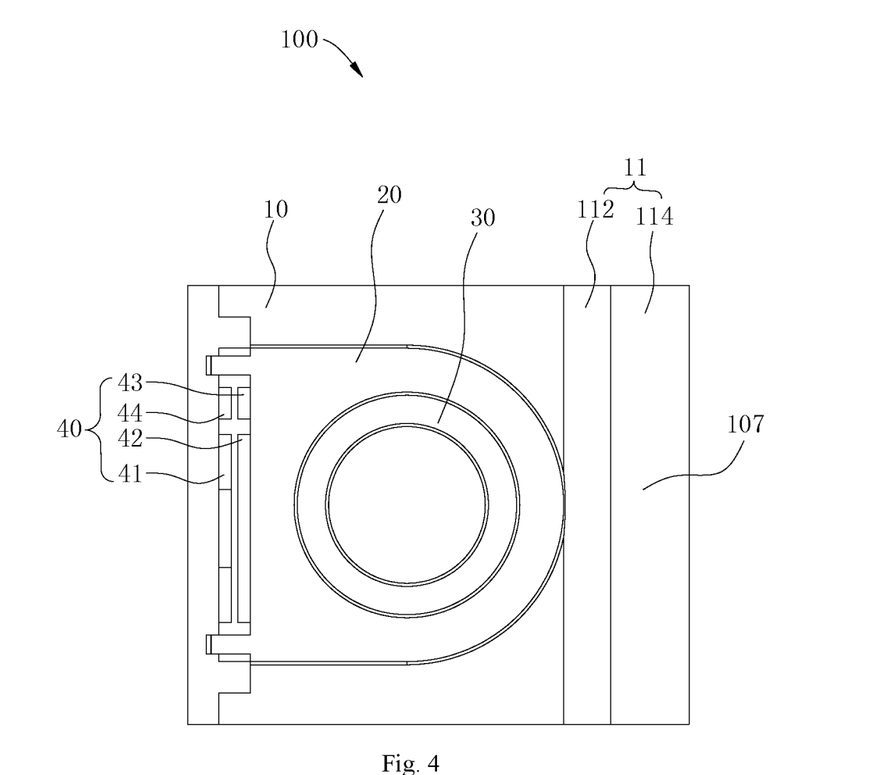
FIG. 4 is a schematic plan view of a camera module of some embodiments of the present disclosure.

As illustrated in FIG. 2 to FIG. 4, the driving member 40 includes a driving coil 41 and a driving magnet 42 corresponding to the driving coil 41. The driving coil 41 is arranged at the fourth side wall 104 and accommodated in the accommodating space 108. The driving magnet 42 is arranged at a side of the movable member 20 away from the notch 107 and opposite to the driving coil 41.

When the driving coil 41 is energized, the driving coil 41 drives the driving magnet 42 to lead the movable member 20 and the lens unit 30 provided in the movable member 20 to slide along the guide slot 109 of the fixed member 10.

Figure 5:
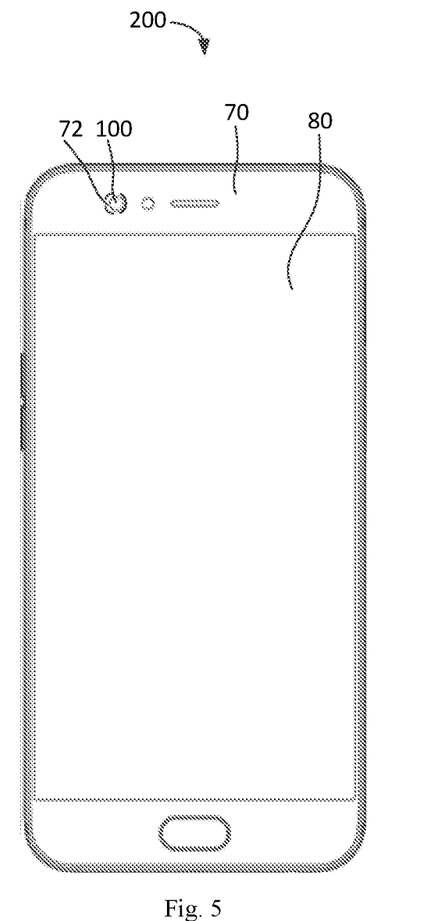
FIG. 5 is a schematic plan view of an electronic device of some embodiments of the present disclosure.

As illustrated in FIG. 5, the electronic device 200 of the embodiment of the present disclosure includes a casing 70, a camera module 100 and a display module 80. The electronic device 200 includes but is not limited to a mobile phone, a tablet computer, a smart watch. This embodiment is illustrated with the mobile phone being taken as an example of the electronic device 200.

The casing 70 is provided with a mounting hole 72. The camera module 100 is mounted in the mounting hole 72. The display module 80 is mounted in a central position of the casing 70, covers the notch 107 of the camera module 100 and exposes the lens unit 30. Specifically, in a light emitting direction of the display module 80, the display module 80 can cover a part of the first sub-top-surface 112, and the display module 80 can also cover a part of the second sub-top-surface 114.

In the electronic device 200 and the camera module 100 of the embodiments of the present disclosure, the side of the fixed member 10 away from the driving member 40 is provided with the notch 107, so that the volume of the camera module 100 can be reduced. Meanwhile, the driving member 40 can drive the movable member 20 to lead the lens unit 30 to move along the optical axis, so that the camera module 100 has the zoom function.

Further, the electronic device 200 of the embodiment of the present disclosure further has the following beneficial effects: the display module 80 is arranged at the notch 107 and exposes the lens unit 30, thereby reducing the space of the casing 70 occupied by the camera module 100, increasing the screen-to-body ratio of the display module 80.

Figure 6:
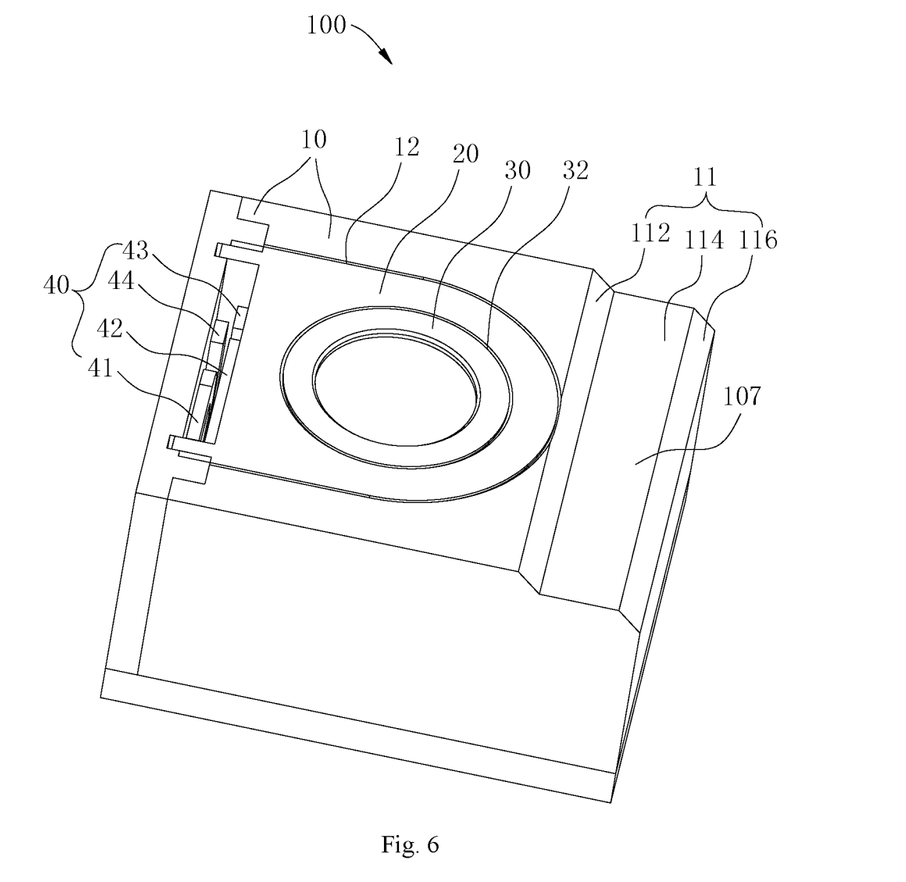
FIG. 6 is a perspective schematic view of a camera module of some embodiments of the present disclosure.

As illustrated in FIG. 6, in some embodiments, the top surface 11 in the above-mentioned embodiments further includes a third sub-top-surface 116 connected with the second sub-top-surface 114, the third sub-top-surface 116 and the first sub-top-surface 112 are located at two opposite sides of the second sub-top-surface 114 correspondingly. The third sub-top-surface 116 is inclined relative to the second sub-top-surface 114 and defines the notch 107 together with the second sub-top-surface 114 and the first sub-top-surface 112. The third sub-top-surface 116 can be a flat surface or a curved surface. When the third sub-top-surface 116 is a flat surface, the third sub-top-surface 116 can be parallel with the first sub-top-surface 112. In the light emitting direction of the display module 80, the display module 80 can cover a part of the third sub-top-surface 116, or the display module 80 can completely cover the third sub-top-surface 116.

As illustrated in FIG. 2 and FIG. 3, in some embodiments, the fixed member 10 of the above embodiments can be a split structure, and the fixed member 10 includes a body 13 and a side plate 14. The first side wall 101, the second side wall 102, the third side wall 103 and the bottom wall 106 together constitute the body 13 of the fixed member 10. The side plate 14 is the fourth side wall 104. The notch 107 runs through the first side wall 101 and the third side wall 103 and is arranged at the end of the second side wall 102 adjacent to the top surface 11. A side of the body 13 of the fixed member 10 away from the notch 107 is provided with an accommodating groove 132, and the side plate 14 is detachably accommodated in the accommodating groove 132 so that the accommodating space 108 for accommodating the movable member 20, the lens unit 30 and the driving member 40 is enclosed by the side plate 14 together with the body 13 of the fixed member 10. In this case, the guide slot 109 of the fixed member 10 can be arranged in the side plate 14 and located at a side of the accommodating space 108, and the guide rail 22 of the movable member 20 is arranged at a side corresponding to the side plate 14. In this embodiment, the fixed member 10 includes the body 13 and the side plate 14, which facilitates the arrangements of the guide slot 109 of the fixed member 10 and the driving coil 41 in the side plate 14, and facilitates the installation of the movable member 20.

Figure 7:
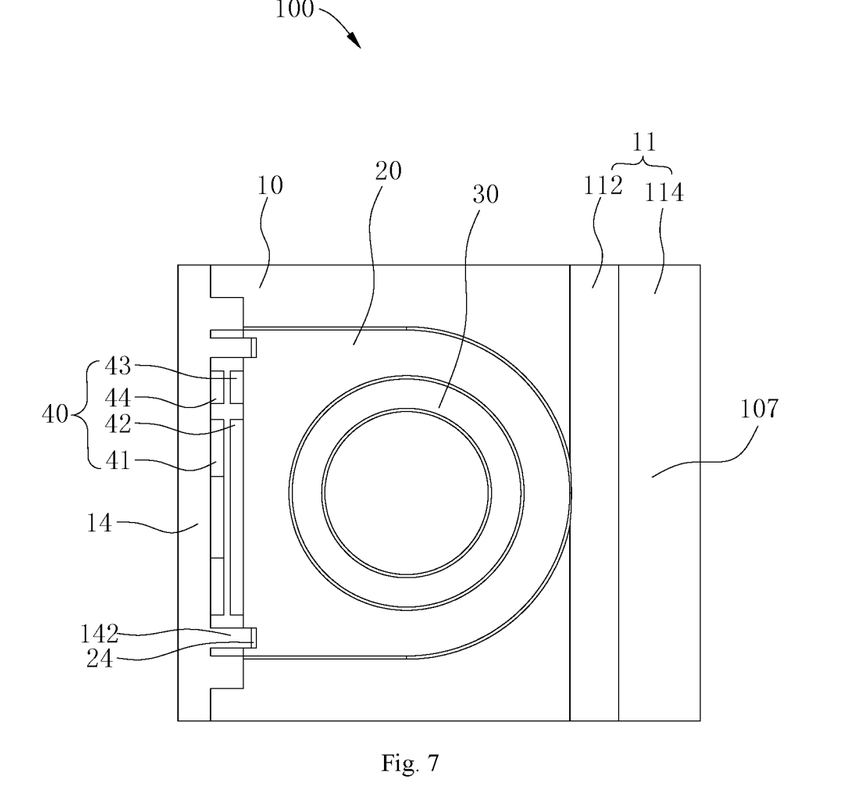
FIG. 7 is a schematic plan view of a camera module of some embodiments of the present disclosure.

As illustrated in FIG. 7, in some embodiments, the fixed member 10 of the above-mentioned embodiments further includes a guide rail 142 provided to the side plate 14, the guide rail 142 of the fixed member 10 is arranged along the direction of the optical axis, that is, a longitudinal direction of the guide slot 142 of the fixed member 10 is substantially parallel to the optical axis of the camera module 100, the movable member 20 is provided with a guide slot 24 fitted with the guide rail 142 of the fixed member 10, the driving member 40 is able to drive the movable member 20 to slide along the guide rail 142 of the fixed member 10. In this case, the fixed member 10 may not be provided with the guide slot 109, and the movable member 20 may not be provided with the guide rail 22. In the present embodiment, the fixed member 10 includes the body 13 and the side plate 14, which facilitates the arrangements of the guide rail 142 of the fixed member 10 and the driving coil 41 in the side plate 14, and facilitates the installation of the movable member 20.

Figure 8:
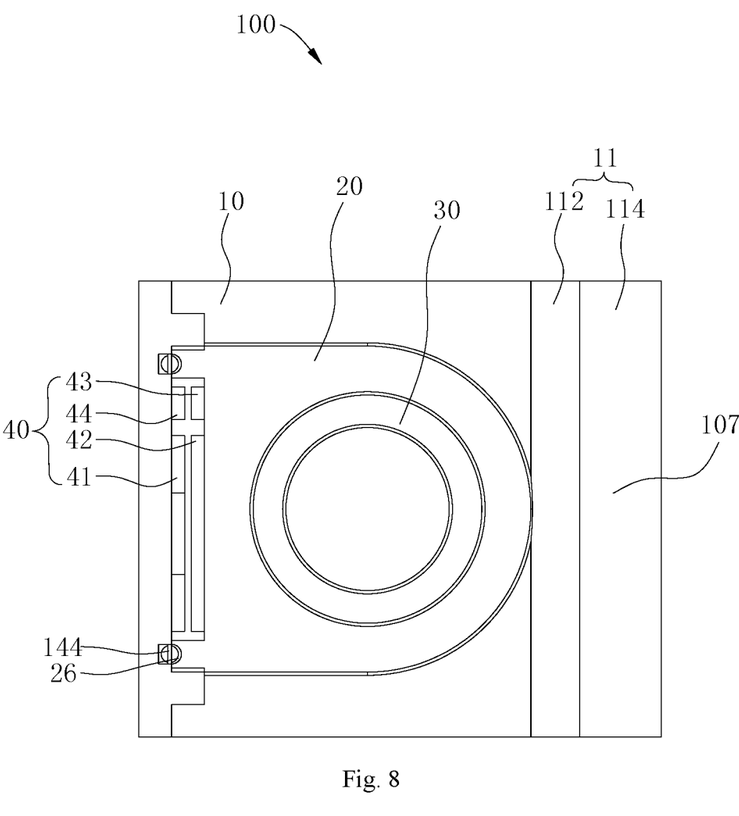
FIG. 8 is a schematic plan view of an electronic device of some embodiments of the present disclosure.

As illustrated in FIG. 8, in some embodiments, the fixed member 10 in the above-mentioned embodiments further includes a ball assembly 144 provided to the side plate 14, the ball assembly 144 of the fixed member 10 is arranged along a direction of the optical axis, that is, a longitudinal direction of the ball assembly 144 of the fixed member 10 is substantially parallel to the optical axis of the camera module 100, the movable member 20 is provided with a ball guide groove 26 fitted with the ball assembly 144 of the fixed member 10, the driving member 40 is able to drive the movable member 20 to slide along the ball assembly 144 of the fixed member 10. The ball assembly 144 of the fixed member 10 includes a ball holder and balls that are rotatably arranged in the ball holder. The ball assembly 144 of the fixed member 10 is fixed to the side plate 14 through the ball holder. In the present embodiment, the fixed member 10 includes the body 13 and the side plate 14, which facilitates the arrangements of the ball assembly 144 of the fixed member 10 and the driving coil 41 in the side plate 14, and facilitates the installation of the movable member 20. Meanwhile, since friction generated by the ball assembly 144 of the fixed member 10 rolling in the ball guide groove 26 of the movable member 20 is less relative to friction generated by the guide rail sliding in the guide groove, the sliding of the movable member 20 relative to the fixed member 10 is thus facilitated.

Figure 9:
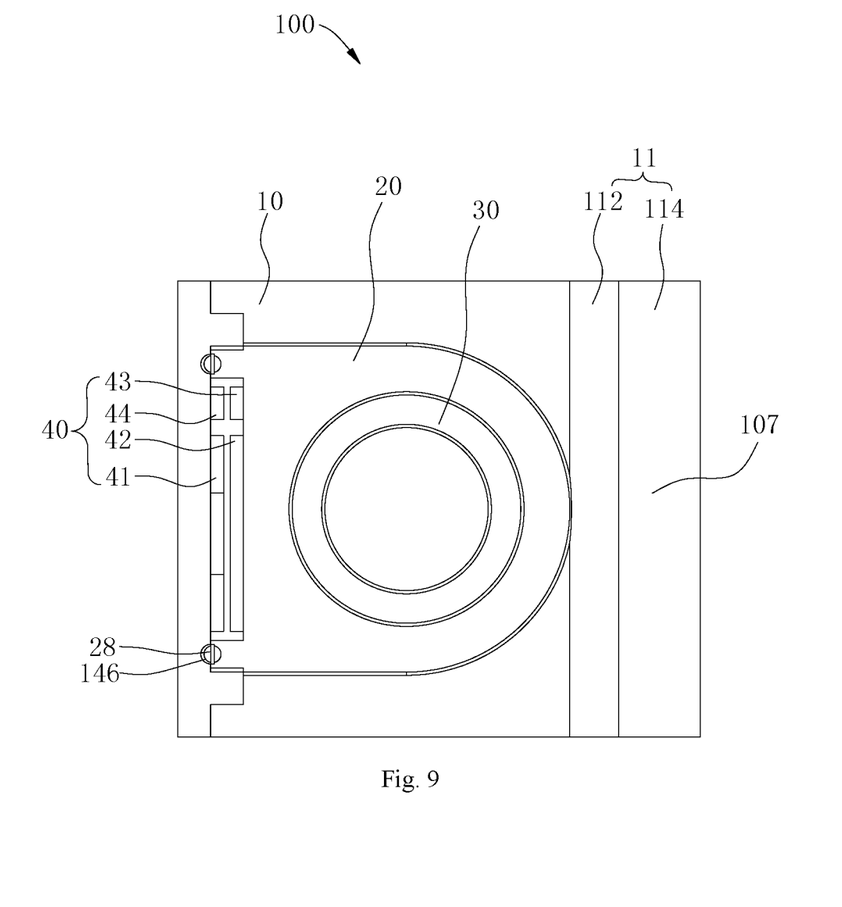
FIG. 9 is a schematic plan view of a camera module of some embodiments of the present disclosure.

As illustrated in FIG. 9, in some embodiments, the side plate 14 of the above-mentioned embodiments is provided with a ball guide groove 146, the ball guide groove 146 of the side plate 14 is arranged along the direction of the optical axis, that is, a longitudinal direction of the guide groove 146 of the side plate 14 is substantially parallel to the optical axis of the camera module 100, the movable member 20 further includes a ball assembly 28 provided to the movable member 20 and fitted with the ball guide groove 146 of the side plate 14, the driving member 40 is able to drive the movable member 20 to slide along the ball guide groove 146 of the side plate 14. In the present embodiment, the fixed member 10 includes the body 13 and the side plate 14, which facilitates the arrangements of the ball guide groove 146 of the side plate 14 and the driving coil 41 in the side plate 14, and facilitates the installation of the movable member 20. Meanwhile, since friction generated by the ball assembly 28 of the movable member 20 rolling in the ball guide groove 146 of the side plate 14 is less relative to friction generated by the guide rail sliding in the guide groove, the sliding of the movable member 20 relative to the fixed member 10 is thus facilitated.

As illustrated in FIGS. 2 to 4, in some embodiments, the driving member 40 of the above-mentioned embodiments further includes a feedback magnet 43, a hall element 44 corresponding to the feedback magnet 43, and a processing chip 45 connected with the hall element 44. The hall element 44 is arranged at the side plate 14 and accommodated in the accommodating space 108, the feedback magnet 43 is arranged at a side of the movable member 20 away from the notch 107 and opposite to the hall element 44, the processing chip 45 is able to control the driving member 40 to drive the movable member 20 to move according to a position of the feedback magnet 43 detected by the hall element 44.

Specifically, the processing chip 45 is further connected with the driving coil 41. The hall element 44 can determine a relative position between the feedback magnet 43 and the hall element 44 and determine a displacement of the movable member 20 based on the detected signal. The processing chip 45 controls the driving coil 41 to be energized according to the displacement. The driving coil 41 drives the driving magnet 42 to lead the movable member 20 and the lens unit 30 provided in the movable member 20 to slide so as to move the lens unit 30 to an appropriate position.

Figure 10:
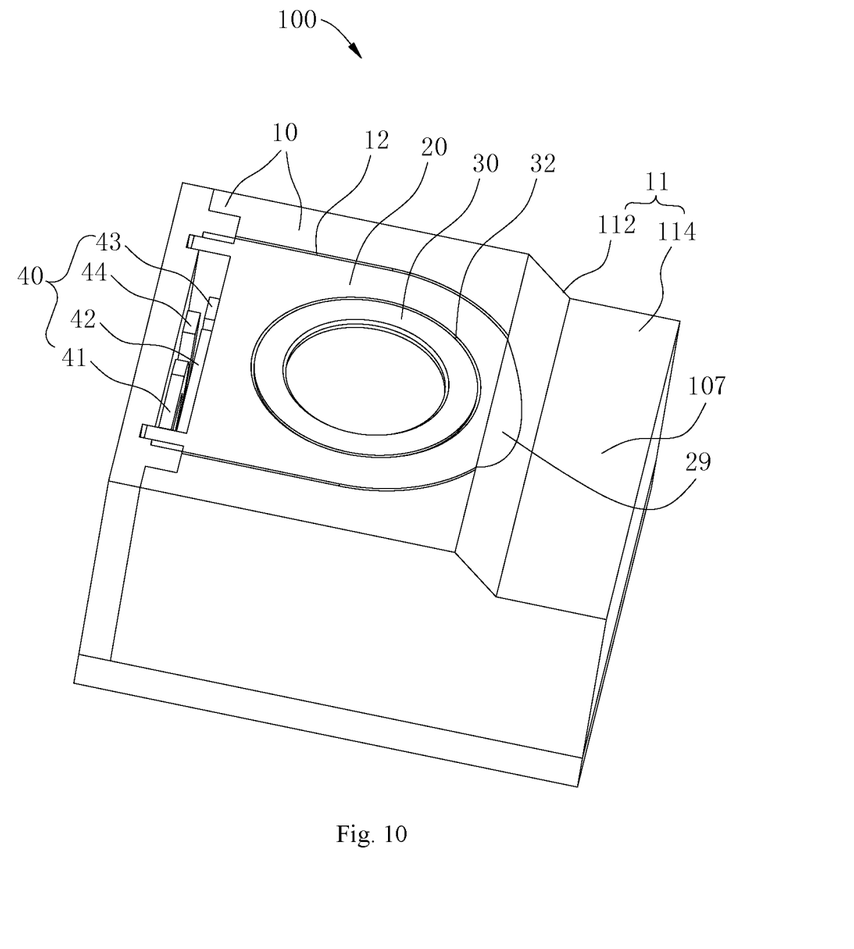
FIG. 10 is a perspective schematic view of an electronic device of some embodiments of the present disclosure.

As illustrated in FIG. 10, in some embodiments, the notch 107 of the above-mentioned embodiments is communicated with the through hole 12, a gap 29 corresponding to the notch 27 is provided in a position of the movable member 20 corresponding to the notch 107. For example, in the camera module 100, the gap 29 and the first top surface 112 are parallel with each other and located in the same plane. In the present embodiment, by proving the gap 29 in the movable member 20, the arrangement of the display module 80 on the notch 107 is not interfered by the movable member 20, thus the space of the casing 70 occupied by the camera module 100 is reduced and the screen-to-body ratio of the display module 80 is increased.

Reference throughout this specification to "certain embodiments," "one embodiment," "some embodiments," "illustrative embodiment," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

Although explanatory embodiments have been shown and described, it would be appreciated that the above embodiments are exemplary and cannot be construed as limitation of the present disclosure, and changes, modifications, alternatives, and variations can be made in the embodiments without departing from the scope of the present disclosure by those skilled in the art. The scope of the present disclosure is defined by the claims ad its equivalents.

What is claimed is:

1. A camera module, comprising:
   a fixed member having a top surface, the top surface being provided with a through hole, the top surface being a step surface and comprising a first sub-top-surface and a second sub-top-surface connected with each other, the first sub-top-surface being inclined with respect to the second sub-top-surface and defining a notch together with the second sub-top-surface;
   a movable member accommodated in the fixed member and corresponding to the through hole;
   a lens unit accommodated in the movable member and corresponding to the through hole; and
   a driving member provided in the fixed member and located at a side of the fixed member away from the notch, the driving member being configured to drive the movable member to lead the lens unit to move along an optical axis of the lens unit,
   wherein the first sub-top-surface is a flat surface, and the second sub-top-surface is a flat surface, wherein the notch is communicated with the through hole.

2. The camera module according to claim 1, wherein the top surface further comprises a third sub-top-surface connected with the second sub-top-surface, the third sub-top-surface and the first sub-top-surface are located at two opposite sides of the second sub-top-surface correspondingly, the third sub-top-surface is inclined relative to the second sub-top-surface and defines the notch together with the second sub-top-surface and the first sub-top-surface.

3. The camera module according to claim 2, wherein the first sub-top-surface is a flat surface, the third sub-top-surface is a flat surface or a curved surface, and when the third sub-top-surface is the flat surface, the third sub-top-surface is parallel with the first sub-top-surface.

4. The camera module according to claim 1, wherein the fixed member comprises a body and a side plate, a side of the body of the fixed member away from the notch is provided with an accommodating groove, the side plate is detachably accommodated in the accommodating groove so that an accommodating space for accommodating the movable member, the lens unit and the driving member is enclosed by the side plate together with the body of the fixed member.

5. The camera module according to claim 4, wherein the fixed member further comprises a guide rail provided to the side plate, the guide rail of the fixed member is arranged along a direction of the optical axis, the movable member is provided with a guide slot fitted with the guide rail of the fixed member, the driving member is able to drive the movable member to slide along the guide rail of the fixed member.

6. The camera module according to claim 4, wherein the movable member comprises a body and a guide rail provided to the body of the movable member, the guide rail of the movable member is arranged along a direction of the optical axis, the fixed member is provided with a guide slot fitted with the guide rail of the movable member, the driving member is able to drive the movable member to slide along the guide slot of the fixed member.

7. The camera module according to claim 6, wherein the guide slot of the fixed member is provided in any one of side walls of the body of the fixed member; or the guide slot of the fixed member is provided in the side plate.

8. The camera module according to claim 4, wherein the fixed member further comprises a ball assembly provided to the side plate, the ball assembly of the fixed member is arranged along a direction of the optical axis, the movable member is provided with a ball guide groove fitted with the ball assembly of the fixed member, the driving member is able to drive the movable member to slide along the ball assembly of the fixed member.

9. The camera module according to claim 4, wherein the side plate is provided with a ball guide groove, the ball guide groove of the side plate is arranged along a direction of the optical axis, the movable member further comprises a ball assembly provided to the movable member and fitted with the ball guide groove of the side plate, the driving member is able to drive the movable member to slide along the ball guide groove of the side plate.

10. The camera module according to claim 4, wherein the driving member comprises a driving coil and a driving magnet corresponding to the driving coil, the driving coil is arranged at the side plate and accommodated in the accommodating space, the driving magnet is arranged at a side of the movable member away from the notch and opposite to the driving coil.

11. The camera module according to claim 10, wherein the driving member further comprises a feedback magnet, a hall element corresponding to the feedback magnet, and a processing chip connected with the hall element, the hall element is arranged at the side plate and accommodated in the accommodating space, the feedback magnet is arranged at a side of the movable member away from the notch and opposite to the hall element, the processing chip is able to control the driving member to drive the movable member to move according to a position of the feedback magnet detected by the hall element.

12. A camera module, comprising:
a fixed member having a top surface and an accommodating space, the top surface being provided with a through hole, the top surface being a step surface and comprising a first sub-top-surface and a second sub-top-surface connected with each other, the first sub-top-surface being inclined with respect to the second sub-top-surface and defining a notch together with the second sub-top-surface, the accommodating space being communicated with the through hole;
a movable member accommodated in the accommodating space and corresponding to the through hole;
a lens unit accommodated in the movable member and corresponding to the through hole; and
a driving member provided in the accommodating space and located at a side of the fixed member away from the notch, the driving member being configured to drive the movable member to lead the lens unit to move along an optical axis of the lens unit,
wherein the first sub-top-surface is a flat surface, and the second sub-top-surface is a flat surface, wherein the notch is communicated with the through hole.

13. The camera module according to claim 12, wherein the fixed member exhibits a barrel shape having a rectangular section contour, the fixed member comprises a first side wall, a second side wall, a third side wall, a fourth side wall, and a bottom wall; the first side wall is opposite to the third side wall, the second side wall is opposite to the fourth side wall, and the bottom wall is connected to each of the first side wall, the second side wall, the third side wall and the fourth side wall; the accommodating space is enclosed by the first side wall, the second side wall, the third side wall, the fourth side wall and the bottom wall together; and the top surface is opposite to the bottom wall.

14. The camera module according to claim 13, wherein the notch runs through the first side wall and the third side wall and is provided at an end of the second side wall adjacent to the top surface.

15. The camera module according to claim 13, wherein the fixed member is provided with a guide slot, and the guide slot of the fixed member is arranged along a direction of the optical axis of the camera module.

16. The camera module according to claim 15, wherein one or a plurality of guide slots of the fixed member is provided; when one guide slot of the fixed member is provided, the one guide slot of the fixed member is arranged in any one of the first side wall, the third side wall and the fourth side wall; when the plurality of guide slots of the fixed member is provided, the plurality of guide slots of the fixed member is arranged in any one or more of the first side wall, the third side wall and the fourth side wall.

17. The camera module according to claim 16, wherein the movable member comprises a body and a guide rail provided to the body, the number of the guide rail of the movable member is the same as the number of the guide slot of the fixed member, and a position of the guide rail of the movable member corresponds to a position of the guide slot of the fixed member, such that the guide rail of the movable member is fitted in the guide slot of the fixed member and is able to slide along the guide slot of the fixed member.

18. An electronic device, comprising:
a casing provided with a mounting hole;
a camera module comprising:
   a fixed member having a top surface, the top surface being provided with a through hole, the top surface being a step surface and comprising a first sub-top-surface and a second sub-top-surface connected with each other, the first sub-top-surface being inclined with respect to the second sub-top-surface and defining a notch together with the second sub-top-surface;
   a movable member accommodated in the fixed member and corresponding to the through hole;
   a lens unit accommodated in the movable member and corresponding to the through hole; and
   a driving member provided in the fixed member and located at a side of the fixed member away from the notch, the driving member being configured to drive the movable member to lead the lens unit to move along an optical axis of the lens unit,
   wherein the first sub-top-surface is a flat surface, the second sub-top-surface is a flat surface, wherein the notch is communicated with the through hole, and the camera module is mounted in the mounting hole; and
a display module, the display module being mounted in the casing, covering the notch and exposing the lens unit.

* * * * *